(12) United States Patent
Knight et al.

(10) Patent No.: US 6,662,649 B1
(45) Date of Patent: Dec. 16, 2003

(54) MATERIAL LEVEL MONITORING AND REPORTING

(75) Inventors: John D. Knight, Scarborough, ME (US); Charles Grempler, Saverna Park, MD (US)

(73) Assignee: Simmons Sirvey Corporation, Richardson, TX (US)

( * ) Notice: Subject to any disclaimer, the term of this patent is extended or adjusted under 35 U.S.C. 154(b) by 0 days.

(21) Appl. No.: 10/121,928

(22) Filed: Apr. 12, 2002

(Under 37 CFR 1.47)

Related U.S. Application Data

(63) Continuation-in-part of application No. 09/272,790, filed on Mar. 19, 1999, now Pat. No. 6,374,187.

(51) Int. Cl.[7] .......................... G01F 23/28; G01S 13/08
(52) U.S. Cl. .................. 73/290 V; 340/621; 250/357.1; 342/124
(58) Field of Search ....................... 73/290 V; 340/621; 324/96; 250/357.1; 342/124

(56) References Cited

U.S. PATENT DOCUMENTS

| | | | | |
|---|---|---|---|---|
| 3,995,212 A | * | 11/1976 | Ross | ........................... 324/642 |
| 4,814,768 A | * | 3/1989 | Chang | .......................... 342/22 |
| 5,063,776 A | * | 11/1991 | Zanker et al. | ........... 73/152.21 |
| 5,438,867 A | * | 8/1995 | van der Pol | .............. 73/290 V |
| 5,609,059 A | * | 3/1997 | McEwan | .................. 73/290 R |
| 5,610,611 A | * | 3/1997 | McEwan | ..................... 342/89 |
| 5,659,321 A | * | 8/1997 | Burger et al. | ............... 342/124 |
| 5,734,346 A | * | 3/1998 | Richardson et al. | ........ 342/124 |
| 5,827,943 A | * | 10/1998 | Schmidt | ..................... 73/1.73 |
| 5,898,308 A | * | 4/1999 | Champion | .................. 324/643 |
| 6,107,957 A | * | 8/2000 | Cramer et al. | .............. 342/124 |
| 6,184,818 B1 | * | 2/2001 | Meinel | ....................... 342/124 |

* cited by examiner

*Primary Examiner*—Daniel S. Larkin
*Assistant Examiner*—Katina Wilson
(74) *Attorney, Agent, or Firm*—Shughart Thomson & Kilroy P.C.

(57) ABSTRACT

An material level monitoring and reporting system uses special micropower impulse radar level sensing probes, with one such probe being inserted into each of a plurality of material containment structures, such as storage tanks. The micropower impulse radar probes use flexible waveguides which extend downward to the tank bottom such that micropower radar impulses travel to and from the liquid surface via a wave guide, with the lapse between emission and reception of the impulse indicating a distance from the probe, and thus a liquid level. Each level sensing probe is connected to a communication link which collects level and status information from the level sensing probes and transmits it to a monitoring site. The material level data may be collected from a plurality of intermediate monitoring sites by a central monitoring sites.

18 Claims, 3 Drawing Sheets

MATERIAL LEVEL MONITORING AND REPORTING

CROSS REFERENCE TO RELATED APPLICATION

This is a continuation-in-part of Ser. No. 09/272,790 for UNDERGROUND STORAGE TANK MONITORING SYSTEM AND METHOD filed Mar. 19, 1999, which issued on Apr. 16, 2002, as U.S. Pat. No. 6,374,187.

FIELD OF THE INVENTION

The present invention relates to a system and method for monitoring material levels in various types of material containment vessels and structures and, more particularly, to such a system and method in which material levels in a number of such containment structures are all monitored using micropower impulse radar probes communicated to a remotely located central, computer.

BACKGROUND OF THE INVENTION

Recent environmental concerns with underground fuel storage tanks have led the Environmental Protection Agency to create strict monitoring rules for gasoline service stations and other users of such tanks. Compliance with these regulations, which can require accuracy within ⅛ inch of liquid level and must detect leakage rates of as little as 0.1 gal/hr. or less, can be an expensive and time consuming activity for a small business such as a service station. In an effort to alleviate this burden, a number of companies have developed systems for monitoring underground storage tanks for leakage compliance. In addition, some of these systems use the data collected for inventory management services as well. Examples of leak detection systems are found in U.S. Pat. No. 4,852,054 to John Mastrandrea; U.S. Pat. No. 5,075,877 to Allan Jacob; U.S. Pat. No. 5,297,423 to Jerome Keating, et al.; U.S. Pat. No. 5,363,093 to Barry Williams et al.; U.S. Pat. No. 5,400,253 to Paul O'Connor; U.S. Pat. No. 5,471,867 to John Tuma et al.; and U.S. Pat. No. 5,757,664 to Warren Rogers, et al. These prior art systems all require complex liquid level sensors which are hardwired to monitoring computers on site. This presents a number of problems. Typically, installation of such liquid level sensors requires the tank top to be accessed, which means tearing up concrete or asphalt surfaces covering the tank. The cables connecting the liquid level sensors to the monitoring computer are usually run beneath the road surface, which also requires the concrete or asphalt to be cut. Such probes usually must be installed in risers other than the fill riser, which can require expensive tank modifications. Many prior art systems require the installation of additional sensors such as temperature and/or pressure probes to detect fuel temperature and internal tank pressure as variables in computing liquid volume. Finally, many prior art centralized systems require a dedicated telephone line from service station to central monitoring computer, which also adds to the expense.

It is clear, then, that an improved underground storage tank monitoring system and method is needed. Such a system and method should avoid the above-mentioned problems of the prior art and should provide reliable monitoring at an economical price. Additionally, there is a need for improved material level monitoring of many types of wet and dry flowable materials stored. in a variety of underground and above-ground tanks and other types of containers and containment vessels and structures.

SUMMARY OF THE INVENTION

The present invention is a material level monitoring system and method which uses a micropower impulse radar transmitter/receiver as a liquid level probe. Technical details for the micropower impulse radar probes are found in U.S. Pat. No. 5,609,059, entitled "Electronic Multi-Purpose Material Level Sensor" and U.S. Pat. No. 5,610,611, entitled "High Accuracy Electronic Materials Level Sensor", which patents are incorporated herein by reference. Such a probe is positioned into each containment structures. The micropower impulse radar probes use a flexible waveguide which extends downward toward the bottom of the containment structure. The probe radiates a micropower radar impulse down the waveguide, to reflect off of the material surface and return to the probe. The time lapse between emission and reception of the impulse by the micropower impulse radar probe is measured and a distance to the material surface, and thus a material level, can be calculated therefrom. If there are multiple layers of material within the containment structure, such as wet and dry layers, immiscible liquids such as oil and water, or the like, a secondary or tertiary reflection of an impulse can detect the level of the interface between the layers, relative to the upper surface. By this means, some types of contamination of a material within a containment structure can be detected. The containment s structures with which the material monitoring systems of the present invention are applicable include wide variety of in-ground, above-ground, and underground structures for holding, storing, or channeling a wide variety of flowable materials including liquid, granular, and particulate materials.

In an exemplary embodiment of the material level monitoring system, each micropower impulse radar probe is connected to a dedicated, low power, spread spectrum transmitter which collects level and status information from the probe, encodes and transmits it to a matching spread spectrum receiver nearby. The receiver converts the spread spectrum encoded signals into data signals and forwards them to a processor, to which is connected a modem and a back-up battery power source. The processor stores the material level information for later transmission to a central monitoring site via the modem. A data entry keyboard may be provided for entering material intentionally stored in the containment structure or withdrawn therefrom, for example where the present invention is used for detecting leakage of the material. Unlike many other systems which periodically poll the monitoring station from the central monitoring site, the inventive system does not require a dedicated telephone line for implementation since the data transmission is initiated from the service station only during regular reporting times or when an abnormal condition occurs.

In addition to spread spectrum encoded radio communication links, the present invention contemplates other modes of communicating material level data from the micropower impulse radar probe assemblies to intermediate material level monitoring stations and central monitoring stations. For example, fiber optic, infrared, satellite, direct laser, and other communication media are contemplated in the present invention.

The material level data derived from the apparatus and methods of the present invention can be used for a number of purposes. Leakage of a stored material or degree of contamination of a stored material may be detected and alerts generated in response to such detection. Material levels can be monitored for accounting and inventory control purposes and to generate replenishment actions in response to depletion of the stored material, such as controlling refilling, scheduling delivery, or the like. Material level detection using the present invention can be used for certain aspects of process control, such as to control a valve to replenish a vessel storing a process material. The system of the present invention can be used for flood detection in natural and artificial waterways and bodies of water and for generating alerts and responses to such flooding, such as the activation of pumps.

OBJECTS AND ADVANTAGES OF THE INVENTION

The objects and advantages of the invention include: providing improved apparatus and methods for monitoring and reporting levels of materials in various kinds of containment vessels and structures; providing such material level monitoring apparatus and methods employing micropower impulse radar probes for detecting relative heights or levels of a wide variety of flowable materials, such as liquids, granular and particulate materials, and the like; providing such apparatus and methods for monitoring material levels within above ground tanks, underground tanks, process vessels, silos, and natural and artificial bodies of water and other fluids such as ponds, lakes, streams, canals, and the like; providing an exemplary embodiment of a material level monitoring system in the form of a fuel storage tank monitoring system and method in which a number of different underground storage tanks can be monitored efficiently from a central monitoring site; providing such a storage tank monitoring system and method in which a micropower impulse radar probe is inserted into each tank via a riser, connected to a spread spectrum transmitter positioned in a manhole containing the riser, which transmitter transmits liquid level information to a remote receiver; providing such a storage tank monitoring system and method in which a special installation system allows the micropower impulse radar probes to be inserted via the fill riser of an existing tank where no monitor riser is available; providing such a storage tank monitoring system and method which uses liquid levels, as measured by the micropower impulse radar probes, along with quantities of fuel dispensed from the tank and fuel replaced in the tank to calculate leak rates and, optionally, perform inventory control; providing such a material monitoring system and method which is particularly economical to install and implement as compared to existing systems; and providing such material level monitoring system and method which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a greatly reduced, fragmentary, partially schematic view of the micropower impulse radar probe and hinge bracket installed within a tank and pivoted outward by a grooved drop tube.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
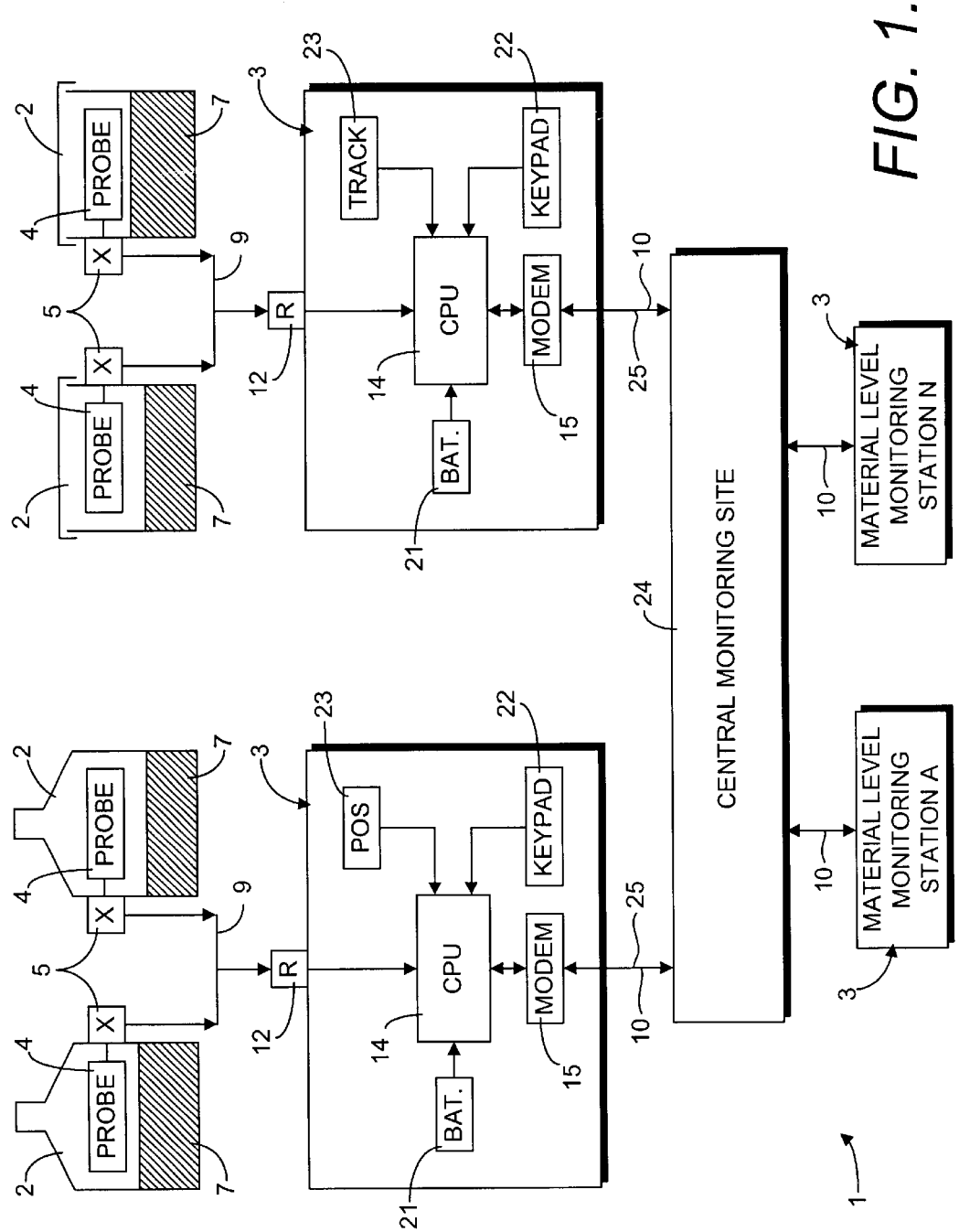
FIG. 1 is a block schematic diagram representing the inventive material level monitoring system and method which embodies the present invention.

Referring to the drawings, and particularly FIG. 1, an underground storage tank monitoring system in accordance with material level monitoring system of the present invention is illustrated in block diagram form and is generally indicated at 1. The system 1 is designed to monitor material or fuel liquid levels within a plurality of containment structures such as underground or above-ground storage tanks, indicated schematically at 2, at each of a number of different monitoring sites 3. A level sensing micropower impulse radar probe 4 is placed within each of the containment structures 2, in a manner described more particularly below.

The containment structures 2 with which the material monitoring systems 1 of the present invention are applicable include a variety of types of structures to hold a variety of flowable materials 7. The structures 2 include various types of above-ground and underground tanks for storing water, fuels, and chemicals; various types of chemical processing vessels; silos; and natural and artificial bodies of water, such as ponds, streams, lakes, canals, or the like. The materials 7 to be monitored may include liquid fuels, non-fuel liquids, non-liquid flowable materials, granular materials, particulates, and the like. In addition to stationary containment structures 2, the material level monitoring systems 1 of the present invention may also be applied to various kinds of liquid and dry materials carried in non-stationary containers such as on trucks, railroad cars, ships, and aircraft. In an exemplary embodiment of the present invention, the system 1 is employed to monitor levels of fuel 7 within both underground and above-ground tanks 2.

The system 1 employs a data communication link 9 between the containment structure 2 and an intermediate monitoring site 3 to communicate material level data sensed by the material level probe 4. In the illustrated system 1, the communication link 9 includes a respective dedicated, low power, spread spectrum radio transmitter 5 connected to each micropower impulse radar probe 4. The transmitters 5 collect fuel level and status information from their connected probes 4, and then encode and transmit it to a matching spread spectrum radio receiver 12 positioned nearby, preferably within the intermediate monitoring site 3, such as a service station building (not shown). Each receiver 12 can monitor multiple transmitters 5. The receivers 12 convert the coded signals into electrical data signals and forward them to a processor (CPU) 14, to which is connected a modem 15 and a back-up battery 21. While the illustrated system 1 employs a radio communication link 9 with spread spectrum encoding, it is foreseen that other modes of encoding and communicating data from the level sensing probes 4 could be employed, such as an infrared communication link, fiber optic cables, direct laser signals, or other types of communication links. Additionally, other types of encoding and/or encrypting of the data signals could be employed.

An input keypad 22 and, optionally, a computerized Point of Sale (POS) or material tracking (TRACK) system 23 are also connected to the processor 14 for tracking material 7 loaded into and withdrawn from the containment structures 2. The processor 14 stores the material level information, including fuel level and accumulated water, for each tank 2 at its associated monitoring site 3, such as a service station. The processor 14 also receives and stores data on fuel dispensed from and fuel replaced into each monitored tank 2. The fuel dispensed information can be input manually via the keypad 22 or automatically via the POS or track system 23.

The processor 14 periodically communicates the stored data to a central monitoring site 24 over a second communication link 10, such as via the modem 15 over standard telephone lines 25. By designating a particular time each day for the processor 14 to connect to the central monitoring site 24, the inventive system 1 does not require a dedicated telephone line for implementation. In addition, if the processor 14 senses an abnormal condition, such as a high level alarm when liquid level is detected above a certain level in the tank, indicating a potential tank overflow, etc., it is programmed to connect to the central monitoring site 24 at any time of day or night to report the condition.

Figure 2:
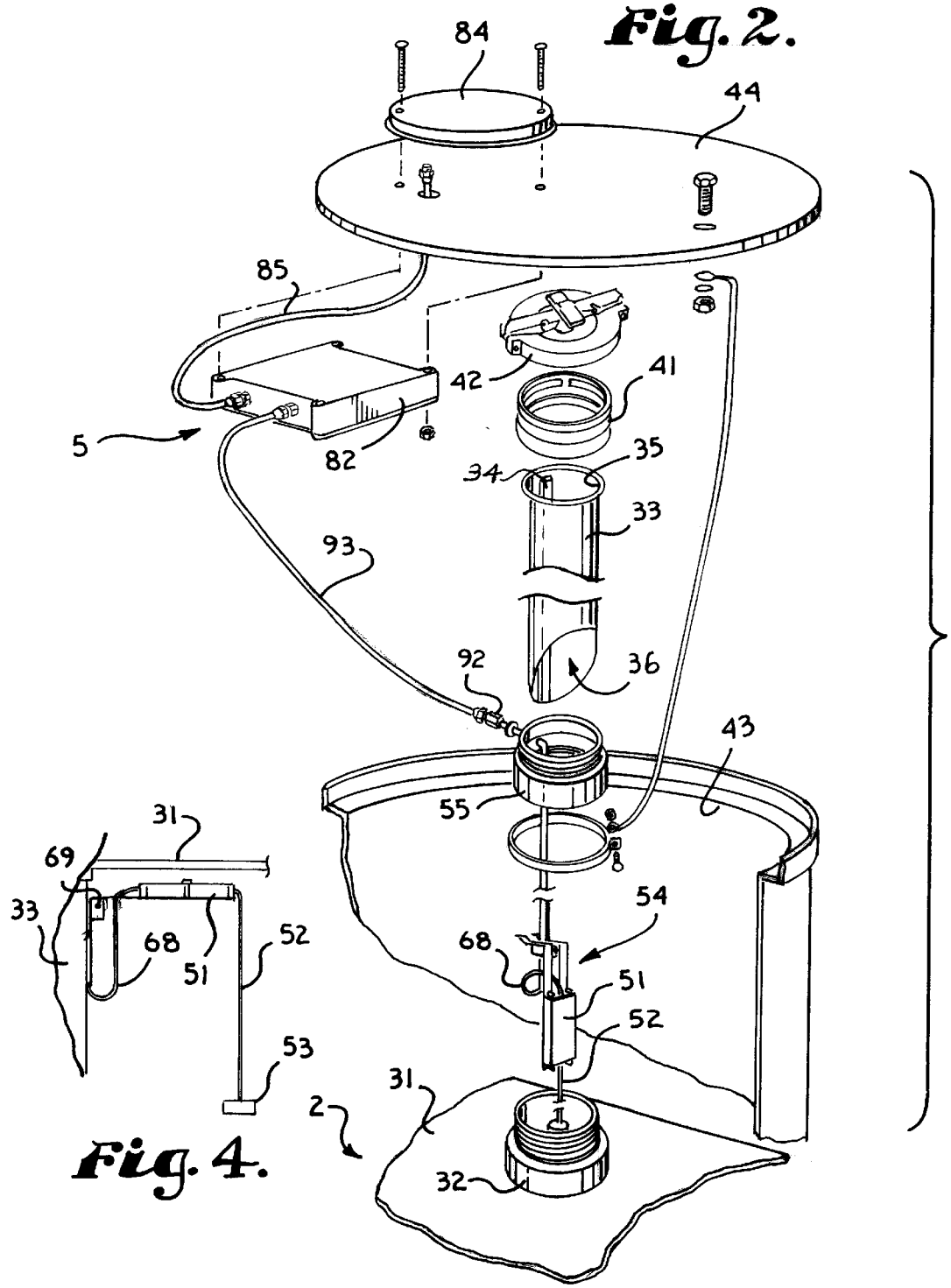
FIG. 2 is an exploded view of a micropower impulse radar probe and probe installation system for installing the inventive underground storage tank monitoring system in an existing tank via the fill riser.
Figure 3:
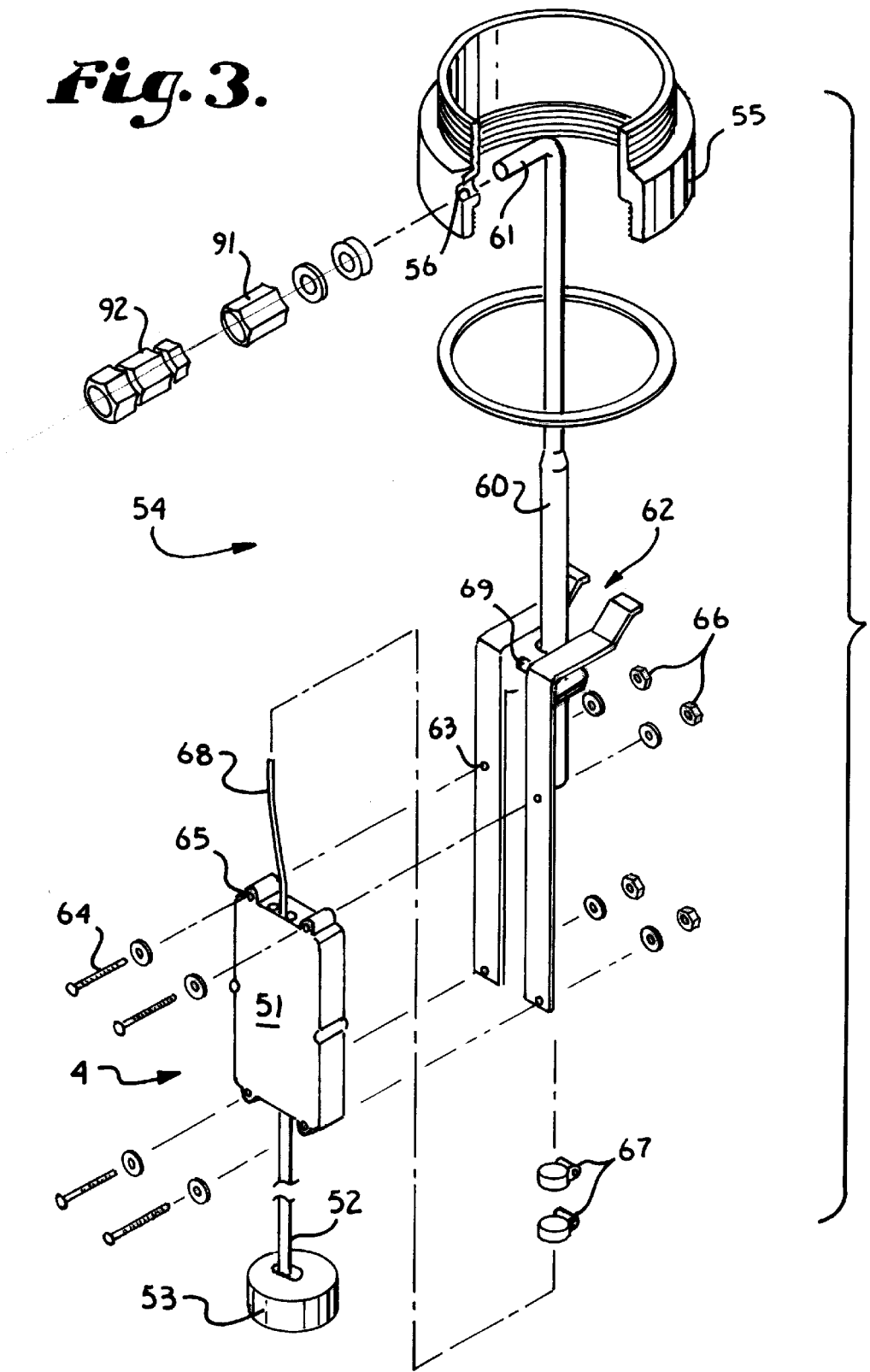
FIG. 3 is a perspective view of the micropower impulse radar probe, installation system, spread spectrum radio transmitter and disc antenna installed in an underground storage tank, with a portions of the tank broken away for illustrative purposes.

FIGS. 2–4 illustrate details of an exemplary material level probe 5 which is particularly well adapted for monitoring fuel levels within an underground fuel tank 2. Referring to FIG. 2, a portion of an upper surface 31 of one of the tanks 2 is shown with a fill riser 32 extending upward therefrom. A drop tube 33 includes an exterior groove 34 extending the length thereof, with the drop tube 33 having an open fuel inlet end 35 and a tapered open fuel outlet end 36. In a known manner, the drop tube 33 is of a length sufficient to reach from the top of the fill riser 32 to a position just above the bottom surface of the tank 2 (not shown). A drop tube adapter 41 secures the drop tube inlet end 35 to the top of the fill riser 32 and a removable fill cap 42 covers the open end of the drop tube adapter 41. The fill riser 32 is positioned within a well 43, and a well cover 44 is provided to close off the top of the well 43.

FIGS. 2–4 illustrate a micropower impulse radar probe 4 including a probe assembly 51 with an elongate waveguide 52 extending downward therefrom and terminating in a circular weight 53. A probe installation system is also illustrated and generally indicated at 54. The installation system 54 includes a riser adapter 55 with a cable routing opening 56 extending through a side wall thereof, an L shaped cable guide 60, a probe hinge bracket 62 positioned on the cable guide 60. An upper leg 61 oft he cable guide 60 extends at substantially a 90 degree angle outward. The probe hinge bracket 62 includes a number of through bores 63 which accommodate respective mounting screws 64 which also extend through respective through-holes 65 on the probe assembly 51 and are secured on the other side of the hinge bracket 62 via washers and nuts 66. The hinge bracket 62 slides over the cable guide 60 and is secured in place thereon via self-locking retaining rings 67. A cable 68 is connected to the probe assembly 51 for conducting signals from the probe assembly 51 to a spread spectrum transmitter 82. A hinge pin 69 allows the hinge bracket to pivot relative to the cable guide 60, as shown in FIG. 4.

FIG. 2 illustrates the spread spectrum transmitter 5 including a transmitter assembly 82, along with a dome antenna 84. A coaxial cable 85 connects the transmitter assembly 82 to the dome antenna 84. It should be recognized that other antenna types can be used, and, if the well cover 44 is non-metallic, an antenna can be positioned within the well 43.

Referring to FIG. 2, in order to install the inventive probe and transmitter into an existing tank fill riser 32, the following steps are implemented:

1. Removal of the existing fill cap, adapter, and drop tube (not shown) from the fill riser,
2. Threading the riser:adapter 55 onto the threaded fill riser 32;
3. Measurement of the depth of the. combined fill riser 32 and riser adapter 55 to determine the appropriate length for the cable guide 60 and cutting it to that length;
4. Installation of the probe assembly 51 onto the hinge bracket 62 via the screws 64 and washers and nuts 66;
5. Sliding the hinge bracket 62, with the probe assembly 51 mounted thereon, onto the cable guide 60 and securing it in place via the self-locking retaining rings 67;
6. Feeding the cable 68 through the cable guide 60 from bottom to top and out an opening in the angled leg 61;
7. Orienting the probe hinge bracket 62 and probe 4 into alignment with the angled leg 61 of the cable guide 60 and feeding the end of the exposed end of the cable 68 through the opening 56 in the side wall of the riser adapter 55 and
8. Inserting the cable guide 60 along with the hinge bracket 62 and probe 4, with waveguide 52 and weight 53 into the tank fill riser 32; inserting the angled leg 61 through the opening 56; and securing it with a compression fitting 91;
9. Connecting a cable fitting 92 to the exposed end of the cable 68;
10. Installing the externally grooved drop tube 33 into the tank 2 via the fill riser 32 with the groove 34 aligned with the cable guide leg 61 until the inlet opening 35 rests atop the adapter 55. With the probe hinge bracket 62 aligned as shown, the drop tube will push the level probe assembly 51 outward pivoting about the hinge pin 69 to the substantially horizontal position shown in FIG. 4, which properly orients it for liquid level sensing;
11. Installing the drop tube adapter 41 onto the adapter 55 so that the cap 42 can be used thereon;
12. Drilling holes in the well cover 44; connecting the cable 85 between the transmitter 82 and the antenna 84; and connecting the cable 93 between the transmitter assembly 82 and the fitting 92 connected to the cable 68;
13. Attaching the antenna 84 and the transmitter assembly 82 to the well cover 44; and
14. Initializing and testing the probe 4 and transmitter 5.

While the underground storage tank monitoring system 1 has been illustrated and described in a preferred embodiment, numerous variations will occur to one of ordinary skill in the art. For example, the system 1 could also be used as a stand alone system for a single service station whereby all level detection and monitoring for a plurality of tanks 2 is done on site. It is thus to be understood that while certain forms of the present invention have been illustrated and described herein, it is not to be limited to the specific forms or arrangement described and shown.

What is claimed and desired to be secured by Letters Patent is:

1. A material level monitoring system for monitoring a level of a flowable material in a containment structure and comprising:
   (a) a micropower impulse radar probe positioned in spaced relation to a material surface of a flowable material within said containment structure, said probe being operative to transmit a micropower radar impulse toward said material surface, to receive a reflected micropower radar impulse returning from said material surface, and to calculate material level data from a time lapse between transmission of said impulse and reception of said reflected impulse;

(b) a remote monitor device positioned remote from said probe and operable to process said material level data; and (c) a communication link coupling said probe to said monitor device to enable communication of said material level data from said probe to said monitor device, said communication link being a radio frequency communication link including a radio transmitter coupled to said probe and a radio receiver coupled to said monitor device.

2. A system as set forth in claim 1 wherein said communication link includes:

(a) a spread spectrum communication link which encodes said material level data into a spread spectrum communication signal and which decodes said spread spectrum communication signal to recover said material level data and to enable processing said material level data by said monitor device.

3. A system as set forth in claim 1 wherein said communication link includes:

(a) a spread spectrum radio communication link including said radio transmitter coupled to said probe and said radio receiver coupled to said monitor device; and (b) said link encoding said material level data into a spread spectrum communication signal for transmission by said transmitter and decoding said spread spectrum communication signal as received by said receiver to recover said material level data and to enable processing said material level data by said monitor device.

4. A system as set forth in claim 1 wherein said system includes:

(a) a plurality of containment structures, each containment structure having a flowable material therein;

(b) a plurality of micropower impulse radar probes, each probe being positioned in vertically spaced relation to flowable material in a respective one of said containment structures; and (c) said communication link coupling each of said probes to said remote monitor device and communicating respective material level data thereto.

5. A system as set forth in claim 4 and including:

(a) a plurality of remote monitoring devices, each remote monitoring device having a plurality of said probes coupled thereto by a respective communication link; and (b) a central monitoring computer having said plurality of remote monitoring devices coupled thereto and relaying respective material level data from said probes to said central monitoring computer.

6. A material level monitoring method for monitoring a level of a flowable material in a containment structure and comprising the steps of:

(a) positioning a micropower impulse radar probe in spaced relation to a material surface of a flowable material within said containment structure;

(b) transmitting a micropower radar impulse from said probe toward said material surface;

(c) receiving a reflected micropower radar impulse returning from said material surface by said probe and calculating material level data from a time lapse between transmission of said impulse and reception of said reflected impulse;

(d) coupling said probe to a remote monitor device positioned remote from said probe using a communication link which is a radio frequency communication link including a radio transmitter coupled to said probe and a radio receiver coupled to said monitor device; and (e) communicating said material level data to said remote monitor device over said communication link to enable processing of said material level data by said remote monitor device.

7. A method as set forth in claim 6 and including the step of:

(a) coupling said probe to said remote monitor device using a spread spectrum communication link which encodes said material level data into a spread spectrum communication signal and which decodes said spread spectrum communication signal to recover said material level data and to enable processing said material level data by said monitor device.

8. A method as set forth in claim 6 and including the steps of:

(a) coupling said probe to said remote monitoring device using a spread spectrum radio communication link including said radio transmitter coupled to said probe and said radio receiver coupled to said monitor device;

(b) encoding said material level data into a spread spectrum communication signal for transmission by said transmitter; and (c) decoding said spread spectrum communication signal as received by said receiver to recover said material level data to enable processing said material level data by said monitor device.

9. A method as set forth in claim 6 wherein a plurality of containment structures have a flowable material therein, and including the steps of:

(a) providing a plurality of micropower impulse radar probes, each probe being positioned in vertically spaced relation to flowable material in a respective one of said containment structures; and (b) coupling each of said probes to said remote monitor device using said communication link to thereby communicate respective material level data to said remote monitor device.

10. A method as set forth in claim 9 and including the steps of:

(a) providing a plurality of remote monitoring devices, each remote monitoring device having a plurality of said probes coupled thereto by a respective communication link;

(b) coupling said plurality of remote monitoring devices to a central monitoring computer; and (c) relaying respective material level data from said probes to said central monitoring computer.

11. A material level monitoring system for monitoring a level of a flowable material in a containment structure and comprising:

(a) a micropower impulse radar probe positioned in spaced relation to a material surface of a flowable material within said containment structure, said probe being operative to transmit a micropower radar impulse toward said material surface, to receive a reflected micropower radar impulse returning from said material surface, and to calculate material level data from a time lapse between transmission of said impulse and reception of said reflected impulse;

(b) a remote monitor device positioned remote from said probe and operable to process said material level data; and (c) a spread spectrum communication link coupling said probe to said monitor device, said communication link encoding said material level data into a spread spectrum communication signal to enable communication of said material level data from said probe to said monitor device and decoding said spread spectrum communication signal to recover said material level data to thereby enable processing said material level data by said monitor device.

12. A system as set forth in claim 11 wherein said communication link includes:

(a) a spread spectrum radio communication link including radio transmitter coupled to said probe and a radio receiver coupled to said monitor device.

13. A system as set forth in claim 11 wherein said system includes:

(a) a plurality of containment structures, each containment structure having a flowable material therein;

(b) a plurality of micropower impulse radar probes, each probe being positioned in vertically spaced relation to flowable material in a respective one of said containment structures; and (c) said communication link coupling each of said probes to said remote monitor device and communicating respective material level data thereto.

14. A system as set forth in claim 13 and including:

(a) a plurality of remote monitoring devices, each remote monitoring device having a plurality of said probes coupled thereto by a respective communication link; and (b) a central monitoring computer having said plurality of remote monitoring devices coupled thereto and relaying respective material level data from said probes to said central monitoring computer.

15. A material level monitoring method for monitoring a level of a flowable material in a containment structure and comprising the steps of:

(a) positioning a micropower impulse radar probe in spaced relation to a material surface of a flowable material within said containment structure, (b) transmitting a micropower radar impulse from said probe toward said material surface;

(c) receiving a reflected micropower radar impulse returning from said material surface by said probe and calculating material level data from a time lapse between transmission of said impulse and reception of said reflected impulse;

(d) coupling said probe to a remote monitor device positioned remote from said probe using a spread spectrum communication link which encodes said material level data into a spread spectrum communication signal and which decodes said spread spectrum communication signal to recover said material level data and to enable processing said material level data by said monitor device; and (e) communicating said material level data to said remote monitor device over said communication link to enable processing of said material level data by said remote monitor device.

16. A method as set forth in claim 15 and including the steps of:

(a) coupling said probe to said remote monitoring device using said spread spectrum radio communication link including radio transmitter coupled to said probe and a radio receiver coupled to said monitor device;

(b) encoding said material level data into said spread spectrum communication signal for transmission by said transmitter; and (c) decoding said spread spectrum communication signal as received by said receiver to recover said material level data to enable processing said material level data by said monitor device.

17. A method as set forth in claim 16 wherein a plurality of containment structures have a flowable material therein, and including the steps of:

(a) providing a plurality of micropower impulse radar probes, each probe being positioned in vertically spaced relation to flowable material in a respective one of said containment structures; and (b) coupling each of said probes to said remote monitor device using said communication link to thereby communicate respective material level data to said remote monitor device.

18. A method as set forth in claim 17 and including the steps of:

(a) providing a plurality of remote monitoring devices, each remote monitoring device having a plurality of said probes coupled thereto by a respective communication link;

(b) coupling said plurality of remote monitoring devices to a central monitoring computer; and (c) relaying respective material level data from said probes to said central monitoring computer.

* * * * *